J. S. MORGAN.
RECOVERING GASES WHICH HAVE BEEN ABSORBED BY SOLIDS.
APPLICATION FILED JUNE 21, 1921.
1,398,882.
Patented Nov. 29, 1921.
2 SHEETS—SHEET 1.
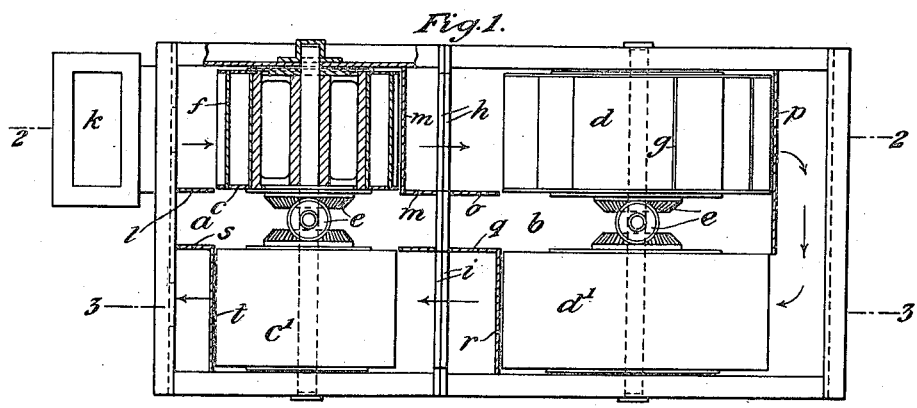
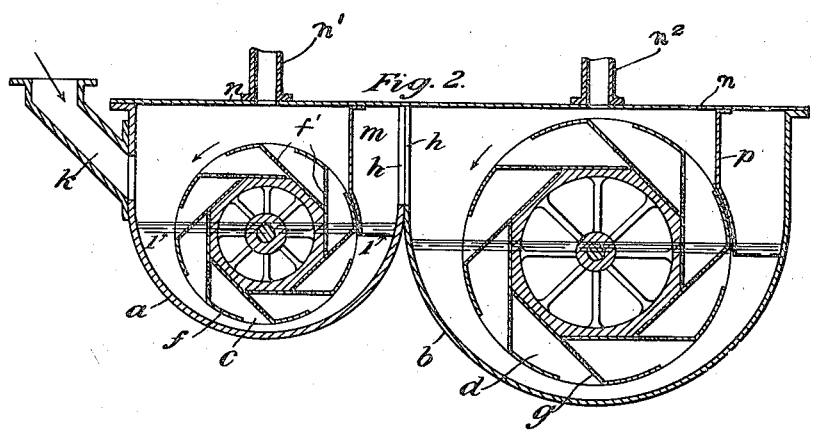
Inventor.
John S. Morgan
By
Attorney J. S. MORGAN.
RECOVERING GASES WHICH HAVE BEEN ABSORBED BY SOLIDS.
APPLICATION FILED JUNE 21, 1921.

1,398,882.

Patented Nov. 29, 1921.
2 SHEETS—SHEET 2.

Inventor.
John S. Morgan

By

Attorney,

UNITED STATES PATENT OFFICE.

JOHN STANLEY MORGAN, OF LONDON, ENGLAND, ASSIGNOR TO THERMAL INDUSTRIAL AND CHEMICAL (T. I. C.) RESEARCH COMPANY, LIMITED, OF LONDON, ENGLAND, A BRITISH COMPANY.

RECOVERING GASES WHICH HAVE BEEN ABSORBED BY SOLIDS.

1,398,882. Specification of Letters Patent. Patented Nov. 29, 1921.

Application filed June 21, 1921. Serial No. 479,315.

*To all whom it may concern:*

Be it known that I, JOHN STANLEY MORGAN, a subject of the King of Great Britain, residing in London, England, have invented certain new and useful Improvements in Recovering Gases Which Have Been Absorbed by Solids, (for which I have filed an application in Great Britain May 21, 1920,) of which the following is a specification.

This invention relates to a method of recovering gases or vapors which have been absorbed by solid absorbents. Solids such as charcoal and alumina readily absorb certain gases at one temperature and part with them at a higher temperature, but inasmuch as these solids are bad conductors of heat considerable time is expended in heating and cooling them.

For example, in obtaining ethylene and the like from coal or other gas by means of charcoal or alumina, the chief difficulty resides in heating the solid to expel the absorbed ethylene, and then cooling it again for re-use. We have found that the method of heating or cooling a solid by causing it to travel through a liquid metal affords a means of overcoming the difficulty, and the invention consists in the application of this method for the purpose in question.

Referring again to the absorption of ethylene as an example, the charcoal leaving the absorber in which it has been more or less saturated with ethylene and its homologues may be caught by a revolving blade wheel or the like by which it is carried beneath the surface of molten lead, whereby its gaseous contents are expelled and are collected at the surface of the metal.

Better results may be obtained by heating the saturated charcoal in stages. Thus it may first descend from the absorber on to the surface of a bath of molten alloy heated to about 120° C. where it is caught by hoods or the like carried radially on a wheel revolving on a horizontal axis. The perforated hoods carry the charcoal into the metal where the gases contained in it are expelled. The gases expelled at this temperature generally contain but little ethylene and may be returned to the absorber. When the charcoal again returns to the surface of the metal it is transferred to a second bath, say of lead, heated to about 350° C. through which it travels as before. For cooling the charcoal it is convenient to return it through the bath of alloy so that some of the heat in it may be imparted to the alloy. In any case the charcoal may be finally cooled by passage in similar manner through a bath of mercury kept cold, by water for instance; or the final cooling may be by means of gas which has been stripped of ethylene and has been cooled by a condenser.

The cooled charcoal is returned to the absorber.

The charcoal used in preliminary absorbers for removing benzine and other constituents may also be treated in the foregoing manner for recovery of benzine, but generally some of the charcoal saturated with ethylene serves for use in the preliminary absorbers.

The accompanying drawings show an apparatus suitable for application of the method.

Figure 1 is a plan of the apparatus from which the cover has been removed, part being in section on line 1—1 of Fig. 2 which is a vertical section on line 2—2 of Fig. 1.

Figure 3:
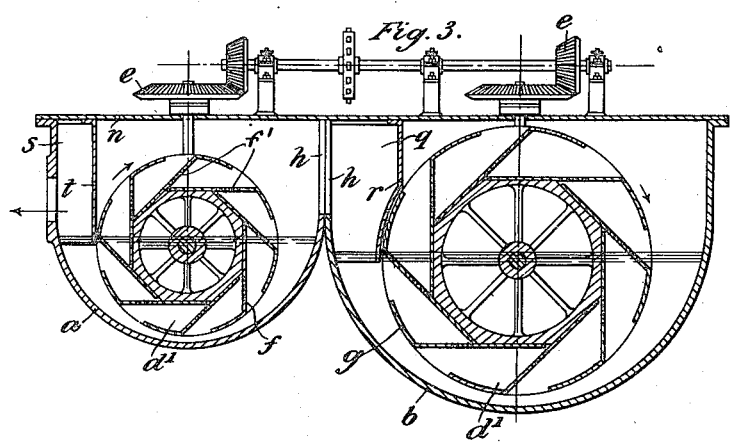
Fig. 3 is a vertical section on line 3—3 of Fig. 1.

The vessels $a$, $b$ of cast-iron or other suitable material contain metal kept molten and heated to the necessary temperature by any convenient mode of external heating. Each vessel contains two drums $c$, $c'$, $d$, $d'$ mounted on a horizontal shaft driven through gearing $e$. The drums carry perforated hoods $f$, $g$ and rotate in the direction shown by arrows. The vessels are placed close together side by side so that openings $h$, $i$ in the adjacent sides register with each other.

It is supposed that charcoal which has absorbed ethylene from coal gas is to be treated in the apparatus. The charcoal is fed down the chute $k$ into a compartment formed by the partitions $l$ and $m$ in the vessel $a$. This vessel contains fusible metal alloy of melting point about 120° C. at which temperature the bath is kept, and the function of this part of the bath is to heat the charcoal to a temperature at which carbon dioxid and other gases are expelled, while the greater part of the ethylene is retained. The charcoal resting on the surface of the metal in the said compartment is caught by the hoods $f$ and carried through the metal, the gases escaping through the perforations $f'$ in the hoods into the compartment whence they pass away through a suitable outlet $n^1$, in the cover $n$ which closes gastight the vessels. On the rising side of the drum the charcoal escapes from the hoods and rises to the surface of the metal behind the partition $m$, whence it falls through the opening $h$ into vessel $b$, which contains molten lead at a temperature of about 350° C.

Since it is desirable that the charcoal shall remain in this vessel longer than in vessel $a$, the drums $d$, $d'$ are of larger diameter than drums $c$, $c'$, the greater peripheral speed of the latter insuring a rate of feed and discharge compensating for the greater capacity of the drums $d$, $d'$.

In the vessel $b$ the charcoal is received in a compartment formed by a partition $o$ (Fig. 1) and is carried by the drum through the lead so that it emerges from the latter behind the partition $p$ whence it is gradually pushed into the sphere of action of the drum $d'$ by which it is returned through the metal to be delivered into a compartment formed by partitions $q$ and $r$. The gases evolved from the charcoal during its double passage through the metal in vessel $b$ escape through a suitable outlet $n^2$ in the cover $n$.

The charcoal now reënters vessel $a$ in which the drum $e$ carries it through the metal to discharge it into the delivery compartment formed by partitions $s$, $t$.

During its second travel through the metal in vessel $a$, the charcoal parts with heat to the metal, economizing that which must be supplied to keep the bath liquid.

Having thus described the nature of the said invention and the best means I know of carrying the same into practical effect, I claim:—

1. A method of expelling gases which have been absorbed by solids, consisting in causing the solid to travel through a bath of liquid metal heated to the required temperature.

2. A process of fractionally expelling gases which have been absorbed by solids, consisting in causing the solid to travel in succession through baths of liquid metal of progressing higher temperature.

3. A process of fractionally expelling gases which have been absorbed by solids, consisting in causing the solid to travel through a bath of liquid metal in which it is heated to a temperature suitable for expelling the gases most easily expelled and then through a bath heated to a higher temperature, and finally to return through the first bath so as to carry into the latter heat which the solid has acquired in the bath or baths of higher temperature.

In testimony whereof I have signed my name to this specification.

JOHN STANLEY MORGAN.